(12) United States Patent
Drover et al.

(10) Patent No.: US 6,714,560 B1
(45) Date of Patent: Mar. 30, 2004

(54) SS7 SIGNALLING TRANSPORT OVER ATM (75) Inventors: Calvin E. Drover, Ottawa (CA); Naile S. Daoud, Kanata (CA); Guy G. Mousseau, Hull (CA)

(73) Assignee: Nortel Networks Limited, Quebec (CA)

( * ) Notice: Subject to any disclaimer, the term of this patent is extended or adjusted under 35 U.S.C. 154(b) by 0 days.

(21) Appl. No.: 09/465,340

(22) Filed: Dec. 17, 1999

(51) Int. Cl.$^7$ ................................. H04J 3/12
(52) U.S. Cl. ................ 370/467; 370/522; 370/465
(58) Field of Search ................. 370/464, 465, 370/466, 467, 522, 386, 395.1, 395.3, 395.6, 399, 397, 524, 409, 395.32, 382, 353

(56) References Cited

U.S. PATENT DOCUMENTS

| | | | | |
|---|---|---|---|---|
| 5,898,667 A | * | 4/1999 | Longfield | 370/225 |
| 6,061,364 A | * | 5/2000 | Hager | 370/467 |
| 6,154,467 A | * | 11/2000 | Hager | 370/467 |
| 6,243,382 B1 | * | 6/2001 | O'Neill | 370/474 |
| 6,320,882 B1 | * | 11/2001 | Patterson | 370/522 |
| 6,324,183 B1 | * | 11/2001 | Miller | 370/467 |
| 6,466,577 B1 | * | 10/2002 | Humblet | 370/395.3 |
| 6,510,156 B1 | * | 1/2003 | Brock | 370/395.1 |

FOREIGN PATENT DOCUMENTS

| | | |
|---|---|---|
| EP | 0 581 087 A1 | 2/1994 |
| WO | WO 97/28629 | 8/1997 |
| WO | WO 99/57851 | 11/1999 |

OTHER PUBLICATIONS

Bellcore, "Generic Requirements for CCS Nodes Supporting ATM High–Speed Signalling Links (HSLs)", GR–2878–CORE, Issue 3, Nov. 1998.

Telcordia Technologies, Inc., "Generic Requirements for CCS Nodes Supporting ATM High–Speed Signaling Links", GR–2878–CORE, Issue 4, Dec. 1999.

* cited by examiner

*Primary Examiner*—Douglas Olms
*Assistant Examiner*—Ricardo M. Pizzaro (57) ABSTRACT

A method of and apparatus for transmitting SS7 signals between a single node (such as, for example, Service Control Points (SCPs), Service Switching Points (SSPs) and Signalling Transfer Points (STPs)) and a plurality of other nodes is disclosed. The method involves connecting a node to an Asynchronous Transfer Mode (ATM) network through a High Speed Link (HSL). A virtual channel for each of the other nodes connected to the ATM network is provisioned on the HSL. Each channel is identified by a Virtual Path Identifier (VPI) and Virtual Channel Identifier (VCI) pair. SS7 signalling data from the single node will be encapsulated with the VCI+VPI pair in an ATM cell and transmitted on the HSL to the ATM network where the ATM cell is transmitted to another node over a Permanent Virtual Circuit (PVC) or Switch Virtual Channel (SVC). The other node may also be connected to the ATM network through a similar HSL with multiple virtual

21 Claims, 9 Drawing Sheets

SS7 SIGNALLING TRANSPORT OVER ATM

FIELD OF THE INVENTION

The invention relates to providing SS7 signalling transport over a high speed network and, more particularly, over an asynchronous transfer mode (ATM) network.

BACKGROUND TO THE INVENTION

The following acronyms will be used throughout this document:
ATM Asynchronous Transfer Mode
AESA ATM End System Address
CCS Common Channel Signalling
CCSAN Common Channel Signalling ATM Network
DPC Destination Point Code
DS0 Digital Signal, Level 0 (64 kb/s)
DS# Digital Signal, Levelx(Note: In practice "DS#" is used synonymously with "T#", e.g. DS1 and T1)
E1 The European counterpart to T1 (32 channels, 64 kbps per channel, 2.048 Mbps total throughput)
HSLs High Speed Links
ITU International Telecommunication Union
LNP Local Number Portability
Mb/s Megabit-per-second
MSU Message Signalling Unit
MTP Message Transfer Part
MUX Multiplexor/De-Multiplexor
PSTN Public Switched Telephone Network
PVC Permanent Virtual Channel
QoS Quality of Service
SAAL Signalling ATM Adaption Layer protocols
SCPs Service Control Points
SPVC Soft Permanent Virtual Circuit
SSCOP Service Specific Connection Oriented Protocol
SS7 Common Channel Signalling System 7
SSPs Service Switching Points
STPs Signalling Transfer Points
SVC Switched Virtual Circuit
T1 Also known as DS1; 24 DS0 channels at 64 kb/s, and one 8 kb/s synchronisation channel. Total transmission rate is therefore 64 kb/s×24+8 kb/s×1=1.544 Mb/s.
VCI Virtual Channel Identifier
VCC Virtual Channel Connections
VPI Virtual Path Identifier A Public Switched Telephone Network (PSTN) is, conventionally, comprised of two networks a voice/data network and a signalling network. The signalling network carries address information for call set-up and tear down. A global standard for telecommunications defined by the International Telecommunication Union (ITU), Telecommmunication Standardisation Sector (ITU-T) for common channel signalling is the Common Channel Signalling System 7 (SS7), a North America version of which has been defined by the American National Standards Institute in T1, the contents of which are hereby incorporated herein; and a corresponding European version of the standard has also been defined by the European Telecommunications Standards Institute.

An SS7 signalling network is made up of different nodes (also referred to as network elements). The nodes include Signalling Transfer Points (STPs), Service Control Points (SCPs) and Service Switching Points (SSPs). These nodes are interconnected by a network of signalling links and together provide a variety of telephony services. For instance, the SS7 network, and its associated protocol, enables, for example: basic call set-up, management and tear down; wireless services; local number portability (LNP); toll-free (800, 888, 877) service; toll (900) service; call forwarding; call display; and three-way calling.

SSPs are switches that originate, terminate or tandem calls. An SSP sends signalling messages to other SSPs to set-up, manage and release voice circuits required to complete a call. An SCP, which provides central database services, may be queried by an SSP to determine how to route a particular call such as, for instance, a toll-free call. An SCP provides the SSP a response, such as the routing number associated with the toll-free number dialled. This query and response occur over SS7 links. STPs, which also form part of the SS7 network, act as routers to incoming signals received from either an SSP or an SCP. These incoming signals are then routed to the appropriate node based on routing information contained within an SS7 message. Acting as a network hub, an STP improves the operation of the SS7 network by reducing the need for direct links between SSPs.

Currently, most of these SS7 links between nodes are running at speeds of 56 Kb/s or 64 Kb/s. High speed links (based on standards such as GR-2878) are emerging to allow greater bandwidth between the various nodes. However, this bandwidth is often not utilised effectively. Moreover, a fault in the hard-wired connection between nodes results in degradation of the service provided, requires a large amount of manual intervention to rectify, and increases the risk of network failure.

Accordingly, it is desired to provide a system which addresses some of these shortcomings.

SUMMARY OF THE INVENTION

The invention provides for multiple virtual channels to be provisioned over a single High Speed Link (HSL) connecting an SS7 node to an Asynchronous Transfer Mode (ATM) network. Each virtual channel on the HSL is dedicated to the transmission of SS7 signalling data between this SS7 node connected to the HSL and another node in communication with the ATM network. A logical connection, which may be, for example, a Permanent Virtual Channel (PVC) or Switched Virtual Circuit (SVC), is provisioned on the ATM network between the SS7 node and the other SS7 node. The invention may provide for direct communication between an SSP and SCP, without the need for an STP intermediary. Further, the invention may provide for a fully associated SS7 network with a reduction in the amount of physical links that would be required in a fully associated conventional SS7 network. The invention may also provide, should a logical connection be configured as an SVC, and relying upon the inherent benefits of an ATM network, for re-routing of SS7 data in the event of a failure of the logical connection.

According to another aspect of the invention, there is provided a method for transmitting SS7 signaling data between a node and an Asynchronous Transfer Mode ("ATM") network, the SS7 signaling data destined for a plurality of physical links in communication with the ATM network, the method comprising: for each of the plurality of physical links, establishing a virtual channel over a multiplexing physical link connecting the node and the ATM network; providing an identifier unique to each of the established virtual channels; encapsulating the SS7 signaling data into ATM cells incorporating the identifier corresponding to a destined one of the plurality of physical links; transmitting encapsulated data from the node to the ATM network over the multiplexing physical link on the virtual channel corresponding to the identifier in the encapsulated data.

According to another aspect of the invention, there is provided a method for transmitting SS7 signalling data between a first, a second and a third node over an Asynchronous Transfer Mode ("ATM") network, the method comprising: establishing a first physical link between the first node and ATM network; establishing a second physical link between the second node and the ATM network; establishing a third physical link between the third node and the ATM network; provisioning a logical connection on the ATM network between each of the first, the second and the third physical links with the ATM network; provisioning a first virtual channel on the first physical link for the second node; provisioning a second virtual channel on the first physical link for the third node; provisioning a first virtual channel on the second physical link for the first node; provisioning a second virtual channel on the second physical link for the third node; provisioning a first virtual channel on the third physical link for the first node; provisioning a second virtual channel on the third physical link for the second node; transmitting SS7 signalling data from the first node to the second node over the first virtual channel of the first physical link, the logical connection interconnecting the first virtual channel on the first physical link and the first virtual channel on the second physical link over the ATM network; transmitting SS7 signalling data from the first node to the third node over the second virtual channel of the first physical link, the logical connection interconnecting the second virtual channel on the first physical link and the first virtual channel on the third physical link over the ATM network; and transmitting SS7 signalling data from the second node to the third node over the second virtual channel of the second physical link, the logical connection interconnecting the second virtual channel on the second physical link and the second virtual channel on the third physical link over the ATM network.

According to one aspect of the invention, there is provided a device for transmitting and receiving data from a High Speed Link ("HSL"), the HSL connecting the device to an Asynchronous Transfer Mode ("ATM") network, the device comprising: a first input/output ("I/O") port in communication with an SS7 first node; a second I/O port in communication with the HSL; a memory in communication with a processor; and the processor is adapted to: receive SS7 signal data from the first I/O port destined for a plurality of SS7 second nodes; generate ATM cells representative of the received SS7 signal data wherein each of the ATM cells generated includes an identifier identifying one of a plurality of channels on the HSL dedicated to transmission of ATM cells between the SS7 first node and one of the plurality of SS7 second nodes; transmit the generated ATM cells through the second I/O port to the HSL; receive ATM cells from the HSL representing SS7 signal data transmitted from the plurality of SS7 second nodes; generate SS7 signal data from the received ATM cells; and transmit the generated SS7 signal data to the SS7 first node.

According to one aspect of the invention, there is provided a method for transmitting SS7 signalling data between a first SS7 node and a second SS7 node, the method comprising: provisioning a first virtual channel on a first physical link between the first SS7 node and an Asynchronous Transfer Mode ("ATM") network, the channel dedicated to the signalling data transmitted between the first and the second nodes; provisioning a second virtual channel on a second physical link between the second SS7 node and the ATM network, the channel dedicated to the signalling data transmitted between the first and the second SS7 nodes; provisioning a logical connection in the ATM network between the first physical link and the second physical link; transmitting the SS7 signalling data between the first SS7 node and the second SS7 node on the first channel, the logical connection and the second channel.

According to one aspect of the invention, there is provided a method of transmitting SS7 signaling data between a first SS7 node and a plurality of other SS7 nodes, the method comprising: on a first physical link connecting the first SS7 node to an Asynchronous Transfer Mode ("ATM") network, for each pair of SS7 nodes, the pair comprising the first SS7 node and a selected one of the plurality of other SS7 nodes: provisioning a virtual channel on the first physical link, the channel dedicated to the SS7 signalling data transmitted between the first SS7 node and the selected one of the plurality of nodes; provisioning a logical connection over the ATM network between the physical link and the selected one of the plurality of SS7 nodes; encapsulating the SS7 signalling data into ATM cells, the ATM cells incorporating in an ATM header an identifier unique to the channel; and transmitting the encapsulated SS7 signalling data from the first SS7 node to the selected one of the plurality of other SS7 nodes over the channel dedicated to communication between the first SS7 node and the selected one of the plurality of other SS7 nodes and over the logical connection between the first physical link and the selected one of the plurality of other SS7 nodes.

According to one aspect of the invention, there is provided a method of transmitting SS7 data between a plurality of nodes, each of the plurality of nodes in communication with an Asynchronous Transfer Mode ("ATM") network, the method comprising: for at least one node of the plurality of nodes, providing for each of the other nodes a virtual channel on a High Speed Link ("HSL"), the HSL connecting the at least one node to the ATM network, the virtual channel dedicated to the transmission of data between the at least one node and another of the each of the other nodes; for each of the virtual channels on the HSL, providing a logical connection over the ATM network between the each virtual channel and the each of the other nodes; transmitting data between the at least one node and another of the each of the other nodes over the logical connection on the ATM network and the virtual channel on the HSL, the data comprising ATM cells.

According to one aspect of the invention, there is provided a method of transmitting SS7 data between a first and a second SS7 node, the second node in communication with an Asynchronous Transfer (ATM) network by a first and second physical link, the first node in communication with the ATM network by a first and a second High Speed Link (HSL), the method comprising: provisioning a first virtual channel between the first HSL and the first physical link, the channel dedicated to the SS7 signaling data transmitted between the first SS7 node and the second SS7 node; provisioning a first logical connection over the ATM network between first HSL and the first physical link; provisioning a second virtual channel between the second HSL and the second physical link, the channel dedicated to the SS7 signaling data transmitted between the first SS7 node and the second SS7 node; provisioning a second logical connection over the ATM network between second HSL and the second physical link; encapsulating the SS7 signaling data into ATM cells, the ATM cells incorporating in an ATM header an identifier unique to the channel; and transmitting the encapsulated SS7 signaling data from the first SS7 node to the second SS7 node over at least one of the virtual channels dedicated to communication between the first SS7 node and the second SS7 node and over at least one of the logical connections and over at least one of the first and second physical links.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood after reference to the following detailed specification read in conjunction with the drawings wherein.

In the Figures, like reference numbers are used to designate like parts.

DETAILED DESCRIPTION OF THE PREFERRED EMBODIMENTS

Figure 1:
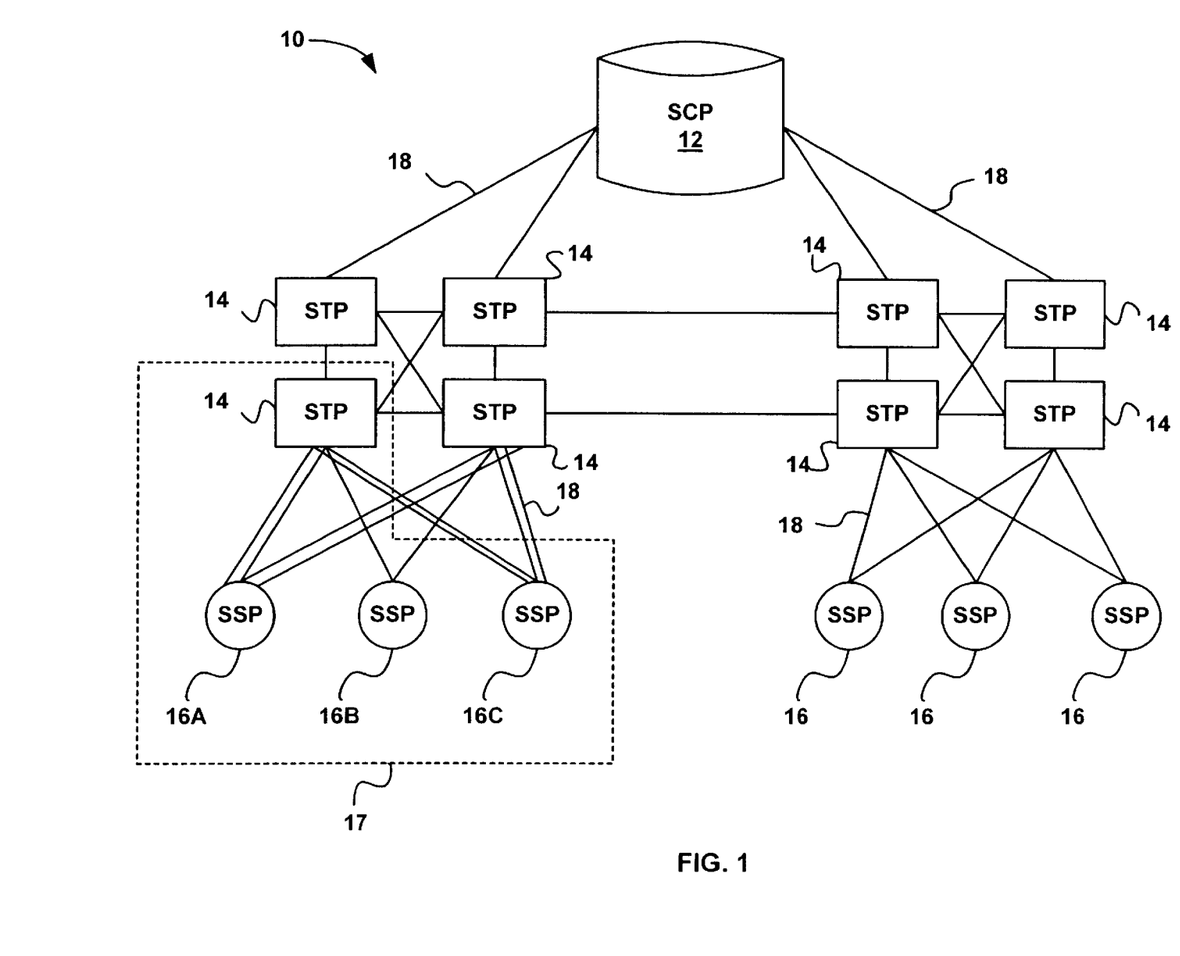
FIG. 1 is schematic of a conventional Common Channelling Signalling network.

A conventional Common Channel Signaling (CCS) Network 10 is illustrated in FIG. 1. Network 10 is comprised a plurality of nodes including SCP 12, STPs 14 and SSPs 16. As illustrated, a plurality of SSPs 16 are directly connected to, and in communication with, a plurality of STPs 14, each such connection being by at least one SS7 link 18. Thus, SS7 links 18 directly connect a pair of nodes, such as STP 14 and SSP 16. SS7 links 18 may be DS0A 56/64 Kb/s low speed links or T1/E1 high speed links.

In November, 1998 a proposed standard (GR-2878-CORE "Generic Requirements for CCS Nodes Supporting ATM High-Speed Signalling Links", Issue 3, November, 1998 from Bellcore, the contents of which are hereby incorporated herein) proposed interconnecting the nodes, such as an SSP 16 in communication with an STP 14, by 1.544 Megabit-per-second (Mb/s) Asynchronous Transfer Mode (ATM) High Speed Links (HSLs) (hereinafter "conventional HSLs") implemented at each of the nodes. The conventional HSLs use the ATM and Signalling ATM Adaption Layer (SAAL) protocols, Service Specific Connection Oriented Protocol (SSCOP) and level 3 of the SS7 protocol's Message Transfer Part (MTP) at the network layer. The proposed GR-2878 standard would be implemented over dedicated DS-1 rate (1.544 Mb/s) physical layer facilities. However, the proposed GR-2878 allows for only a single virtual channel to be utilised on a physical HSL. That is, a single conventional HSL would be dedicated for each signalling link between a pair of nodes. This requires that each originating SS7 link must terminate on a unique card as each SS7 link enters the ATM network at a unique point and each SS7 link crosses the ATM network on a dedicated Permanent Virtual Channel (PVC). For example, if communication between the nodes of portion 17 of network 10 (FIG. 1) was implemented according to the proposed GR-2878 standard, STP 14 would require five conventional HSLs and five ATM network cards (one for each SS7 link with SSP 16A, 16B, 16C). The GR-2878 proposal does not efficiently allocate network resources.

Figure 2:
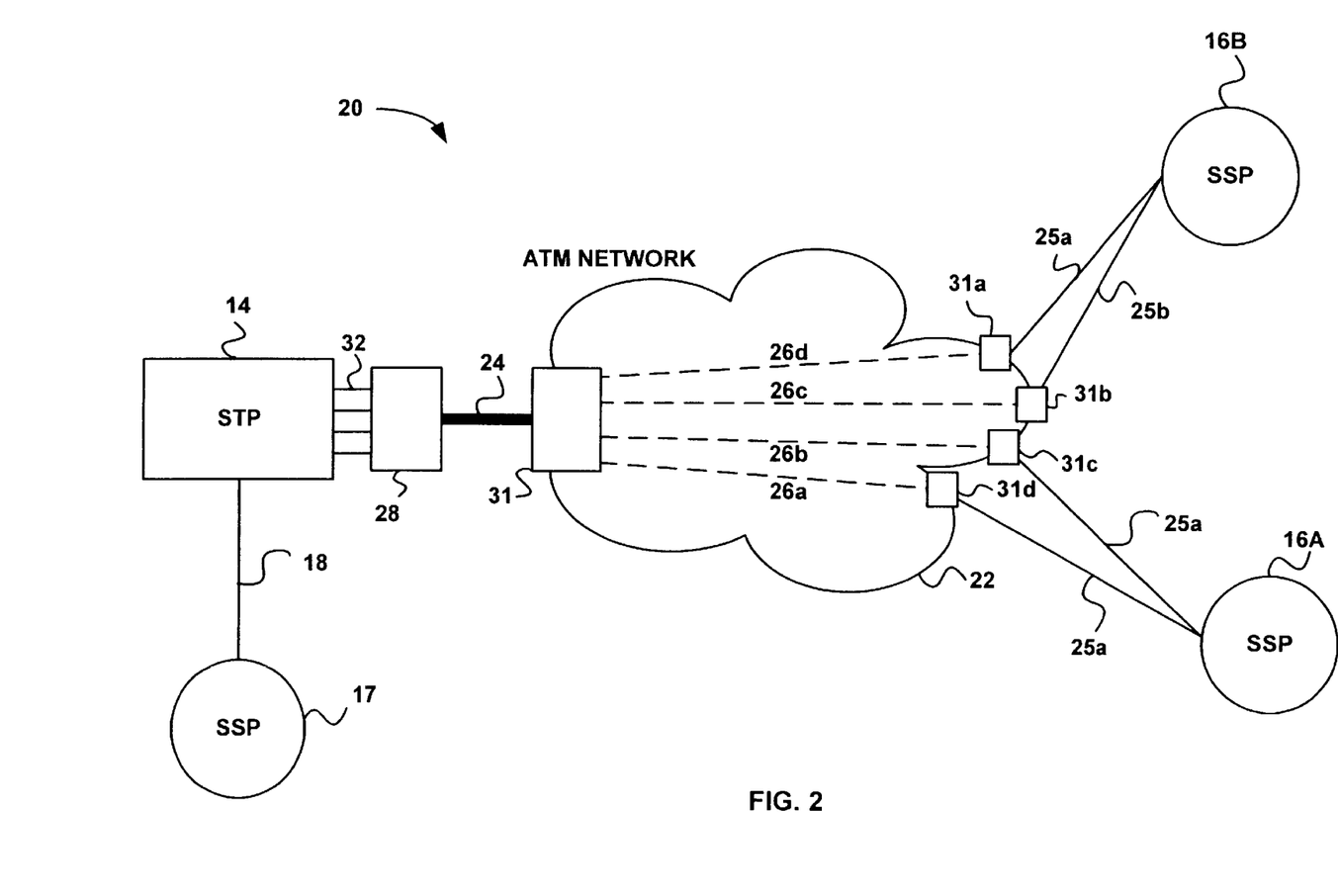
FIG. 2 is a schematic of a portion of FIG. 1 incorporating an embodiment of the invention.

An embodiment of the invention, namely Common Channel Signalling ATM network (CCSAN) 20, is illustrated in FIG. 2. Network 20 comprises an STP 14 in communication with ATM network 22 by a single HSL 24, such as a T1 physical link. Also in communication with ATM network 22 are SSPs 16A and 16B. STP 14 transmits SS7 data in the typical fashion over data lines 32, which may be, for example, internal data bus lines of STP 14. Data lines 32 terminate at HSL Multiplexor (MUX) 28. Although illustrated as being separate from STP 14, HSL MUX 28 may be physically attached to, installed into or form part of STP 14. HSL MUX 28 encapsulates and multiplexes data received from data lines 32 and encapsulates the multiplexed data into ATM cells then transmits these cells over a single HSL 24 to a conventional ATM edge switch 31. Edge switch 31 provides for switching of ATM cells. SSPs 16 are each in communication with ATM network 22 by a plurality (two as illustrated) physical conventional HSLs 25a, 25b and 25c, 25d (collectively conventional HSLs 25). Conventional HSLs 25a, 25b, 25c and 25d terminate at conventional edge switches 30a, 30b, 30c and 30d (collectively edge switches 30). Conventional edge switches 30, which may, in some environments, be identical to edge switch 31, provide for ATM cell transmission from ATM network 22 on conventional HSLs 25. As will be appreciated STP 14 could also, for example, be an SSP, SCP or an integrated node. Conventional HSLs 25 may implement the GR-2878 standard described above or, alternatively, could implement the present invention and, therefore, be identical to HSL 24.

Also in communication with STP 14, via conventional physical link 18, is conventional SSP 17. STP 14 and SSP 17 communicate with each other in the normal manner.

SS7 data encapsulated in ATM cells received by ATM edge switch 31 from HSL 24 is transmitted over logical connections (or Virtual Channel Connections—VCCs), shown in phantom, 26a, 26b, 26c, 26d (collectively logical connections 26) as required. Logical connections 26 may be a Permanent Virtual Channel (PVC) or a Switched Virtual Circuit (SVC). As is known by those skilled in the art, a PVC maintains a single physical route through the ATM network at all times while an SVC is a dynamic connection between two nodes. Data transmitted over logical connections 26 is received at one of edge switches 30 proximate to conventional HSLs 25. Edge switches 30 transmit the received data over the single channel provided for by a conventional HSL 25 to an SSP 16 where the SS7 data is re-assembled processed by the SSP 16 in a conventional manner.

As will now be apparent, the present invention, an aspect of which is embodied in HSL MUX 28, enables communication between an upgraded node (that is, a combination of a conventional node, such as, for example, STP 14, together with HSL MUX 28 and a multiplexed HSL 24) and a conventional, or non-upgraded, node, such as SSP 16. Moreover, as will become apparent, a single HSL, such as HSL 24, provides a plurality of virtual channels upon which all SS7 communication for, or from, a single node, can be transmitted, or received. Further, communications received by STP 14 from conventional SSP 17 can be processed and responsive messages transmitted to SSPs 16 over ATM network 22 using the present invention. In this scenario, the modified communications schema between STP 14 and an SSP 16 is invisible to conventional SSP 17.

It should be apparent that the present invention can also provide for the transmission of signals from a single node to a plurality of other nodes over a single HSL 24. To ensure that the presently deployed nodes, such as STP 14 and SSP 16 (FIG. 2) can exploit the present invention, the operation of the present invention is effectively "invisible" to conventional nodes. That is, nodes, such as STP 14 and SSPs 16, operate in a conventional manner, while the present invention, an aspect of which is embodied in HSL MUX 28, operates to multiplex and encapsulate and de-multiplex and de-encapsulate SS7 data transmitted or received over a single HSL 24 in accordance with an aspect of the invention.

Moreover, and as noted above, it is common in a conventional network 10 (FIG. 1) for dedicated links 18 between, for example, an STP 14 and an SSP 16 to not be fully utilised. That is, the capacity of links 18, at many points in time, may be far in excess of the throughput of a transmission. Moreover, each dedicated link 18 connecting to a node, STP 14 for instance, requires dedicated communication hardware. Similarly, the capacity of a conventional HSL 25 (FIG. 2) also may have capacity far in excess of the data actually transmitted. Also, each conventional HSL 25 must terminate at ATM network 22 using dedicated communications hardware. These inefficiencies of conventional network 10 are addressed by CCSAN 20 (FIG. 2) since only a single (and highly utilized) link, HSL 24, communicates with ATM network 22. Moreover, only a single edge switch (edge switch 31) is required in combination with an HSL for a node (associated with a MUX 28) to communicate with ATM network 22, thereby reducing the complexity and cost of deploying the present invention, as compared to a conventional network. As will be appreciated, MUX 28 may connect to edge switch 31 with more than one HSL 24 if the amount of signalling data surpasses the capacity of a single HSL 24 or, for example, for redundancy purposes.

Figure 3:
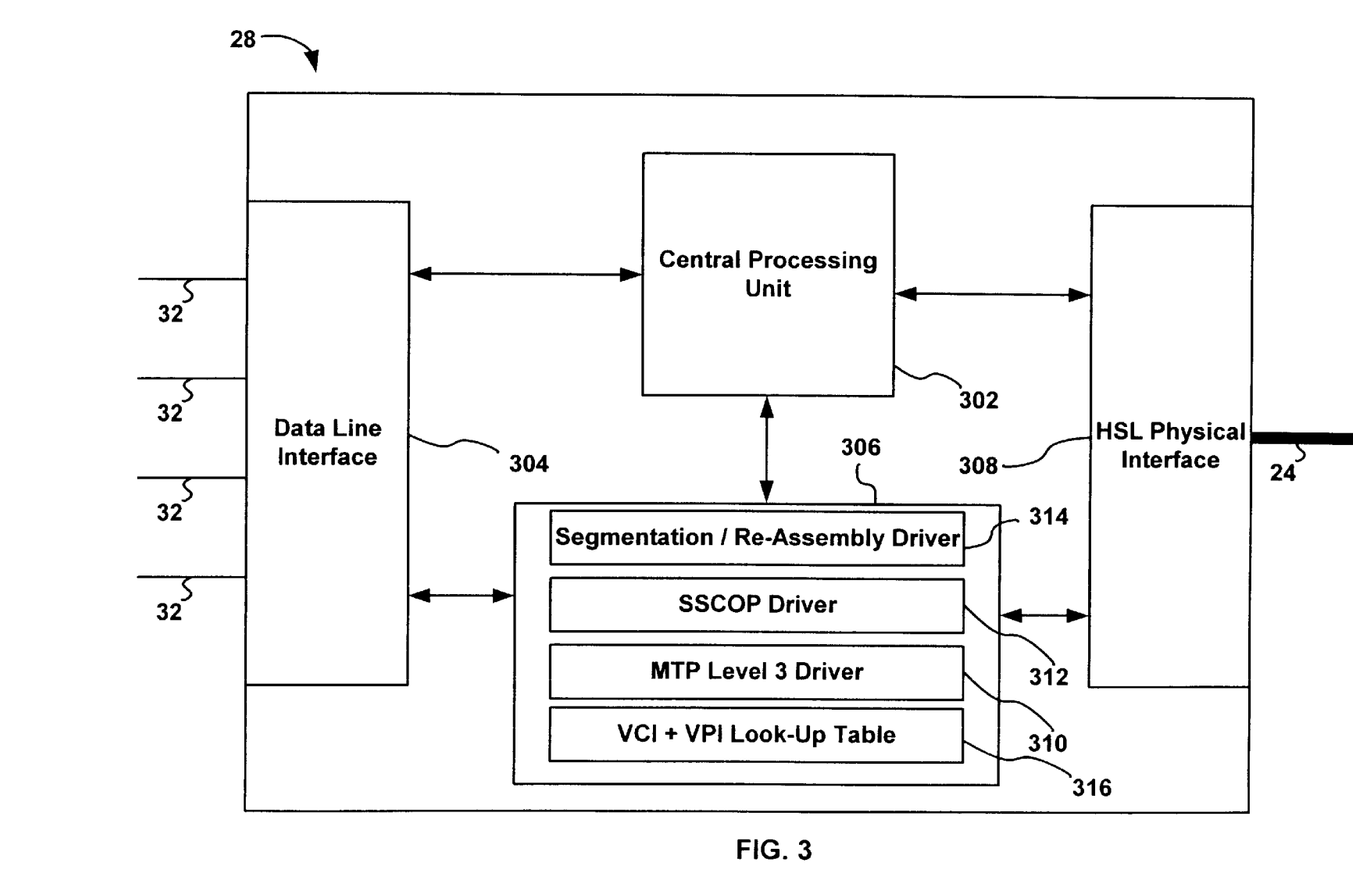
FIG. 3 is a schematic of a portion of FIG. 2 incorporating an embodiment of the invention.

HSL MUX 28 is shown in greater detail in FIG. 3. HSL MUX 28 comprises a physical link interface 304 in communication with physical data lines 32. Data line interface 304, which transmits and receives conventional SS7 data, may be a conventional interface for communicating with a data bus formed from data lines 32. Controlling data flow to and from interface 304 is Central Processing Unit (CPU) 302. CPU 302 also controls memory 306 and data flow to and from HSL physical interface 308. HSL physical interface 308 transmits to and receives data from HSL 24.

Memory 306 includes signal buffers, data and instruction storage and may be, for example, a combination of conventional storage devices, such as removable media, conventional Read Only Memory (ROM), Random Access Memory (RAM), fixed storage devices or the like. As shown, memory 306 includes a Segmentation and Re-Assembly (SAR) Driver 314, a Service Specific Connection Oriented Protocol (SSCOP) Driver 312 and a Message Transfer Part Level 3 (MTPL3) Driver 310. Also stored in memory 306 is VCI+VPI pair look-up table 316. VCI+VPI look-up table stores a unique VCI+VPI pair for each data line 32 (which is explained in greater detail below).

In operation of HSL MUX 28, SS7 data is transmitted from STP 14 (FIG. 2) over data lines 32 and is received by data line interface 304. The SS7 data is then segmented and encapsulated into ATM cells, described in greater detail below, by SAR driver 314, under the control and operation of CPU 302, and transmitted to HSL physical interface 308 for transmission over HSL 24.

ATM cells are also received at HSL MUX 28 from HSL 24 at HSL physical interface 308. These ATM cells are stripped of the ATM header data (described in greater detail below), through operation of SAR driver 314 (under control of CPU 302). The SSCOP data (if present) in the ATM cells received by HSL physical interface 308 is also stripped from the ATM cells by SSCOP driver 312. (As is known, the SSCOP protocol (described in ITU-T Recommendation Q.2110, the contents of which are hereby incorporated herein) facilitates reliable transmission of signalling messages between communicating devices, such as, for example, nodes. Further, the SSCOP portion of an ATM cell is only present in the first cell in a group of cells generated to encapsulate a data signal that, due to its length, must be segmented into several ATM cells.) The remaining portion of the ATM cells received by HSL MUX 28, namely the ATM payload portion, is then re-assembled into standard SS7 signalling data by operation of SAR driver 314 and MTPL3 driver 310, under control of CPU 302. The re-assembled SS7 signalling data is then transmitted to a selected one of data lines 32 by data line interface 304 based on the DPC found within the re-assembled SS7 signalling data. STP 14 the receives the re-assembled SS7 in the conventional manner.

Figures 4A, 4B:
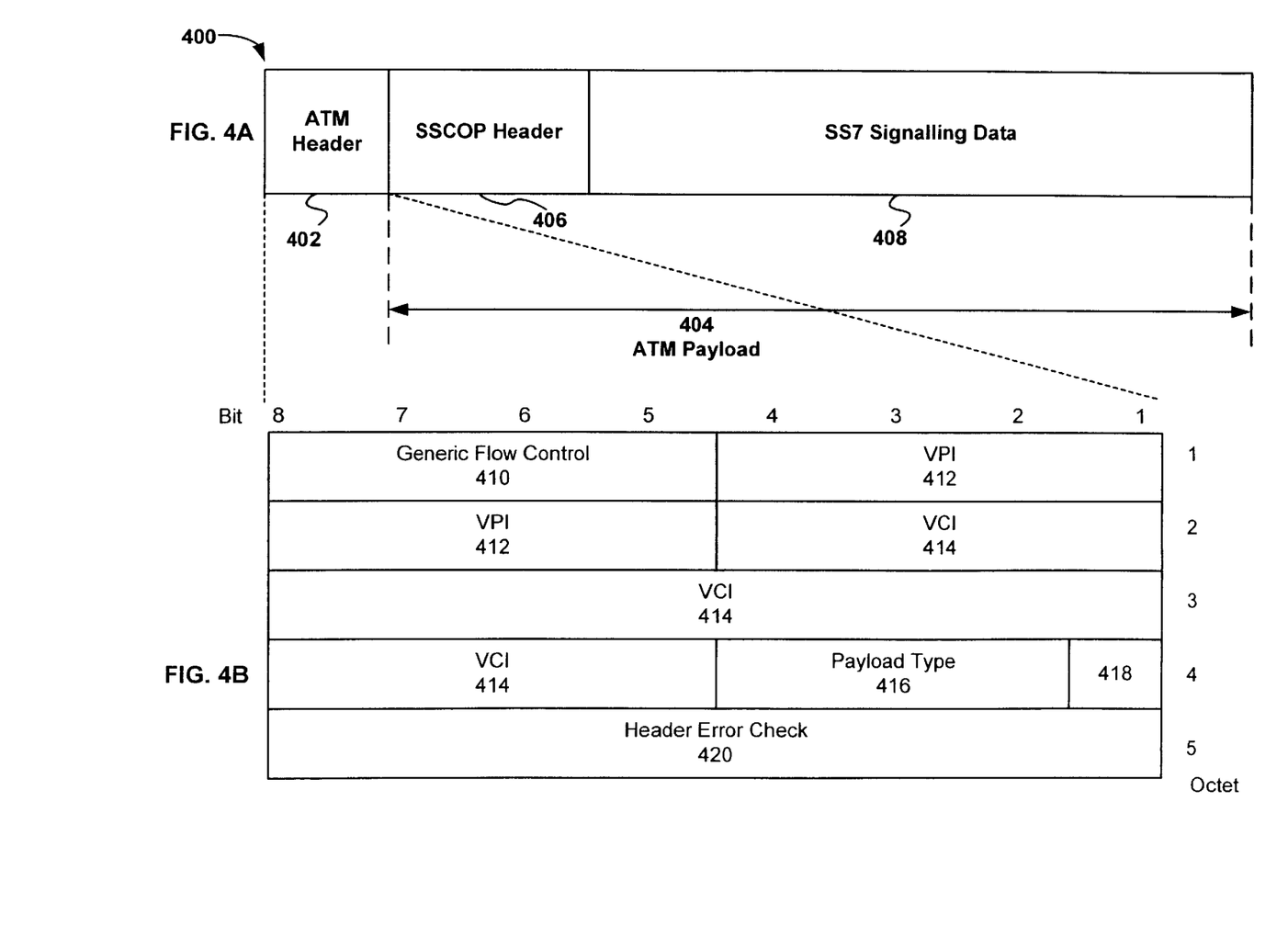
FIG. 4A is a schematic of a data structure, a further embodiment of the invention.
FIG. 4B is a schematic of a portion of the data structure of FIG. 4A.

An ATM cell generated or received by HSL MUX 28 will be of the format illustrated schematically in FIGS. 4A and 4B. FIG. 4A illustrates a typical ATM cell 400 that complies with an embodiment of the present invention. ATM cell 400, which has a fixed length of 53 bytes (eight bits per byte) comprises a typical ATM header 402, which is five octets (forty bits) in length, and a payload 404 of forty-eight bytes. The payload is further sub-divided into an SSCOP header 406 (which is used, typically, only in the first cell of a series of cells containing data that has been segmented into multiple ATM cells), having a length of twelve bytes, and SS7 payload 408, filling the remaining thirty-six (or forty-eight if the SSCOP header 406 is not present) bytes of ATM cell 400.

FIG. 4B illustrates a typical ATM header portion 402 of ATM cell 400. Header 402 includes four bit Generic Flow Control field 410, eight bit VPI field 412, sixteen bit VCI field 414, three bit Payload Type field 416, single bit Cell Loss Priority field 418 and Header Error Check field 420.

The Virtual Path Identifier (VPI) and Virtual Channel Identifier (VCI), conventional in the ATM art, are two new fields that modify the SS7 signalling link data fill table—a table known to a person with ordinary skill in the art and used to define the links in a conventional link set. As is known, the VCI+VPI combination are used to identify, uniquely, each logical connection between ATM switches across ATM network 22 terminating at an edge switch (such as, for example, edge switches 30—FIG. 2). The VPI may, for example, have a value of between 0 and 255, thereby requiring eight bits to define. The VCI may, for example, have a value between 0 and 65535, thereby requiring sixteen bits to define.

As is known by those skilled in the art, the SS7 signalling link data fill table contains, for a particular routing path, a link set comprising links which facilitate the desired routing for a signalling unit. In the modified table, the links will include reference to an HSL 24 in combination with a VCI+VPI pair identifying a channel on the referenced HSL 24 that can similarly facilitate the desired routing.

MUX 28 stores, for each virtual channel on HSL 24, a unique VCI+VPI pair. Accordingly, SS7 data received by MUX 28 from STP 14 will be encapsulated into an ATM cell incorporating a VCI+VPI pair which identifies a virtual channel on an identified HSL 24. Similarly, ATM cells transmitted from ATM edge switch 31 towards STP 14, will also incorporate a unique VCI+VPI thus identifying a specific virtual channel on HSL 24.

As described above, memory 306 stores VCI+VPI pair look-up table 316. Each stored VCI+VPI pair will uniquely map incoming MSUs on data lines 32 to a selected virtual channel of HSL 24 based on the Destination Point Code (DPC) contained within the MSU. As is known by those skilled in the art, an MSU contains a DPC. The DPC is used by MUX 28 to retrieve from look-up table 316 a VCI+VPI pair. Each DPC will map to a set of transmission routes known in the art as a route set. The route set identifies a plurality to a set of links (known in the art as a link set). Each link in a link set can be used to route a packet (conventionally a signalling unit but, in the present embodiment an ATM cell 400—FIG. 4A) to the destination identified by the DPC. In the present embodiment, the link set will include an identifier of a HSL to be used (there may be more than one HSL connecting a MUX 28 to ATM network 22) that are available to route to the destination identified by a particular DPC and a virtual channel (identified by a VCI+VPI pair) that can be used for the desired routing on a particular channel. Accordingly, for each DPC, MUX 28 will retrieve from look-up table 316 of memory 306 a unique VCI+VPI pair (hereinafter the "MUX VCI+VPI pair"). Moreover, each MUX VCI+VPI will uniquely map to a different, and conventional, VCI+VPI pair stored in edge switch 31 (hereinafter the "edge switch VCI+VPI pair"). The edge switch VCI+VPI pair uniquely identifies a logical connection 26 of ATM network 22 (FIG. 2) enabling the mapping of a virtual channel of HSL 24 to a logical connection 26. As a result of the mapping of incoming MSUs arriving on a data line 32 to a logical connection 26, HSL 24 of network 22 provides a plurality of virtual channels from STP 14 to ATM network 22. That is, SS7 signals which are normally provided over a plurality of separate physical links from STP 14 to other nodes are multiplexed onto a single HSL, such as HSL 24, resulting in a more efficient allocation of resources. In other words, whereas in the past each signalling link only connected a node to one other selected other node, in the present invention one HSL can connect to multiple destinations over the ATM network 22. As will be appreciated, the form of look-up table 316 described above may be altered and still fall within the scope and spirit of the present invention. For example, a DPC may be used to determine an index and an HSL from a plurality of HSLs connecting MUX 28 to edge switch 31. The index may then be used, for example, as pointer to determine a specific VCI+VPI pair from group of VCI+VPI pairs.

Accordingly, SS7 data transmitted by STP 14 will be received at MUX 28, delimited into ATM cells, have a VCI+VPI pair inserted into the headers of these cells identifying a particular virtual channel on a particular HSL 24 and transmitted on this virtual channel to edge switch 31. Edge switch 31 will receive the ATM cells transmitted by MUX 28, map the MUX VCI+VPI pair to another, and possibly different, edge switch VCI+VPI pair which uniquely identifies a logical connection terminating at edge switch 31. The edge switch VCI+VPI pair will then be inserted into the header of the ATM cells to be transmitted over network 22.

In the reverse direction, edge switch 31 will receive ATM cells from ATM network 22. These ATM cells received from ATM network 22 will incorporate a VCI+VPI pair which uniquely identifies a logical connection (such as a logical connection 26) terminating at edge switch 31. Edge switch 31, from the VCI+VPI pair stored in the headers of the ATM cells received, will determine the virtual channel on HSL 24 for which the cell is destined. This determination results in the recall of a edge switch VCI+VPI pair which is stored in edge switch 31. The ATM cells received from network 22 are modified by replacing the VCI+VPI pair in the ATM header with the corresponding MUX VCI+VPI pair. The modified ATM cells are then transmitted to MUX 28 over HSL 24. MUX 28 then generates SS7 data from the ATM cells received over HSL 24 and transmits the SS7 data to STP 14 over links 32.

Thus, for each of conventional HSLs 25 a virtual channel on HSL 24 is established by MUX 28.

As is known in the art, a PVC connection between two nodes is typically provisioned by an operator of ATM network 22 (FIG. 2). Once the PVC has been established, a VCI+VPI pair will be stored in an Edge switch at each end point which uniquely identifies the PVC. The PVC will remain in service until a fault occurs or the PVC is disabled by an operator.

Figure 5:
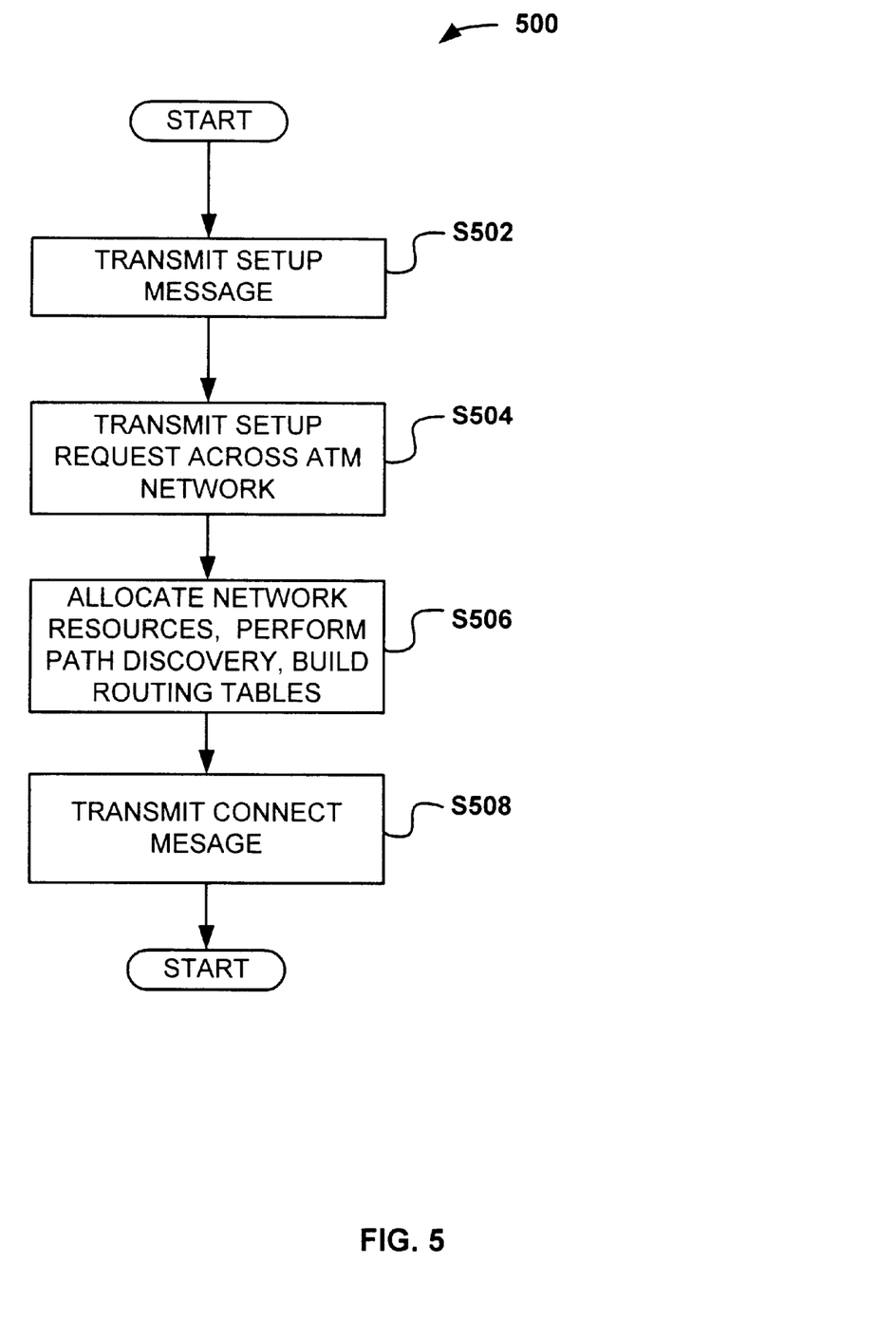
FIG. 5 is a flow chart illustrating the operation of a first configuration of a portion of FIG. 2.

As described above, and in contrast to a PVC, an SVC is a dynamic connection between two nodes. In overview, and as background, operations 500 (FIG. 5) are performed to establish an SVC between two nodes, such as STP 14 and SSP 16 over ATM network 22. An SVC is established over the ATM network by having a requestor, such as edge switch 31 (FIG. 2) transmit a SETUP message (S502) to ATM network 22. The set-up message will incorporate a Virtual Path Identifier (VPI), Virtual Channel Identifier (VCI), Quality of Service (QoS) parameters, and an ATM End System Address ("AESA") (the address of the destination edge switch 30 corresponding to the destination physical connection of the ATM network 22, in this case one of the HSLs 25 connecting to an SSP 16—FIG. 2). The set-up message is then transmitted across ATM network 22 through a plurality of "hops" through nodes (not illustrated) comprising ATM network 22 (S504). At each hop, ATM network 22 allocates resources (based on the QoS parameter), performs path discovery (based on the AESA), and builds routing tables for future ATM cells (S506). Upon receipt of the set-up message at the destination switch corresponding to the AESA, the destination switch transmits a response, a CONNECT message, to edge switch 31 confirming that the requested SVC has been established (S508). A look-up table in the ATM edge switch will then include a VCI+VPI pair unique the logical connection established. Should a fault occur, operations 500 are performed again to establish a SVC along a different route. Otherwise, the SVC will remain in operation until either party to the SVC (i.e., an edge switch) transmits a TEARDOWN message which results in the SVC being "disconnected".

Figure 6:
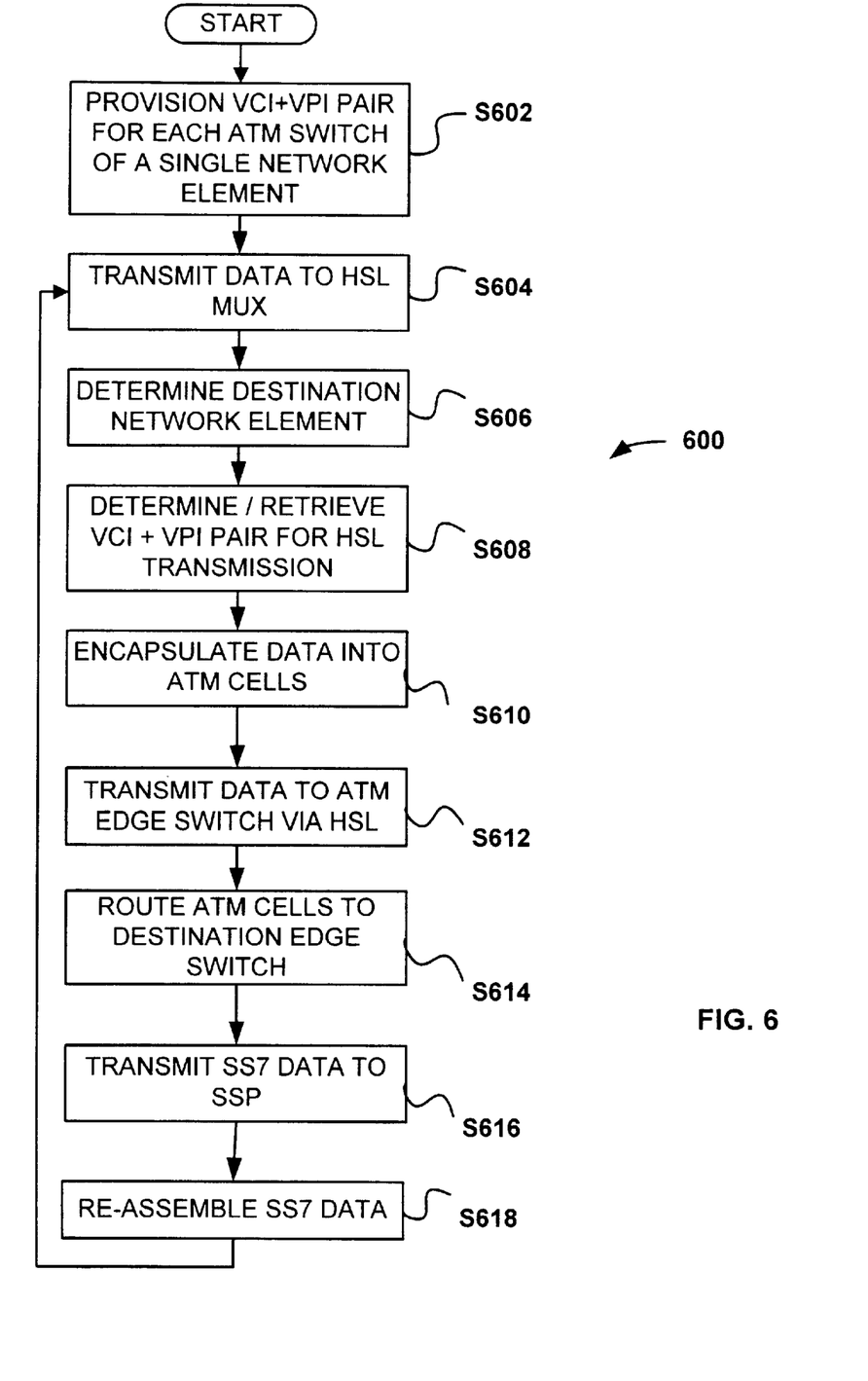
FIG. 6 is a flow chart illustrating the operation of a second configuration of a portion of FIG. 2.

The operation of the embodiment illustrated in FIG. 2 is outlined with reference to operations 600, illustrated in FIG. 6. Operations 600 are performed subsequent to the establishment of a logical connection 26 (FIG. 2), which, as described above, may be a PVC or an SVC. Steps S602-S618 represent data flowing from STP 14 to an SSP 16. A VCI+VPI pair is provisioned (S602), typically by an operator of HSL MUX 28 and edge switch 31 in communication with HSL MUX 28 (via HSL 24). The MUX VCI+VPI pair identify a channel on HSL 24 upon which SS7 signals destined for an edge switch 30 of a single conventional HSL 25, will be transmitted from STP 14 towards ATM network 22 (for SSP 16 of FIG. 2 there will be four such VCI+VPI pairs, one for each conventional HSL 25). Step S602 is repeated, as required, for each conventional HSL 25 from which STP 14 is to receive data or to which STP 14 is to transmit data. Similarly, at edge switch 31, a routing table will be provisioned mapping the provisioned MUX VCI+VPI pairs to edge switch VCI+VPI pairs. The edge switch VPI+VCI pairs identify a specific logical connection over ATM network 22. Once a specific VCI+VPI pair has been provisioned, STP 14 transmits SS7 data along data lines 32 in a conventional manner to data line interface 304 of HSL MUX 28 (S604). Upon receipt of the SS7 data from STP 14, HSL MUX 28 determines the node and, if required, the conventional HSL 25, for which the SS7 data is destined (S606) by using the DPC stored within the SS7 data which will be mapped to a specific link of a link set. Once the destination link is determined, CPU 302 accesses VCI+VPI look-up table 316 to determine and retrieve the VCI+VPI pair which uniquely identifies the channel of a HSL 24 on which the SS7 data is to be transmitted (S608). Based on the retrieved information, standard ATM cell(s) 400, incorporating the VCI+VPI pair retrieved from look-up table 316, together with the SSCOP header and SS7 data received from data lines 32 are encapsulated (S610) and transmitted, by HSL physical interface 308, to ATM edge switch 31 on HSL 24 (S612). ATM edge switch 31 then routes ATM cells received from HSL 24, based on its internal routing (or look-up) table (i.e. based on the mapping of the MUX VCI+VPI pairs to the edge switch VCI+VPI pairs) to the appropriate logical connection 26, based upon the ATM header 402 information (S614). The cells are then received in a conventional fashion by an edge switch 30 connected to a conventional HSL 25 (S616) where the data is transmitted to an SSP 16 where the SS7 payload of the received ATM cells are re-assembled (S618).

Upon receipt of ATM cells by edge switch 31 over the ATM network 22, edge switch 31 will access its routing table and route the received ATM cells, with an appropriate VCI+VPI pair, to a selected channel of HSL 24. The ATM cells received by HSL MUX 28 (at HSL physical interface 308), from HSL 24, are then stripped of their ATM header and SSCOP header (if present) and reassembled by operation of SAR driver 314 and SSCOP driver 312, under operation of CPU 302 and transmitted over a selected one of data lines 32 to conventional STP 14.

Figure 7:
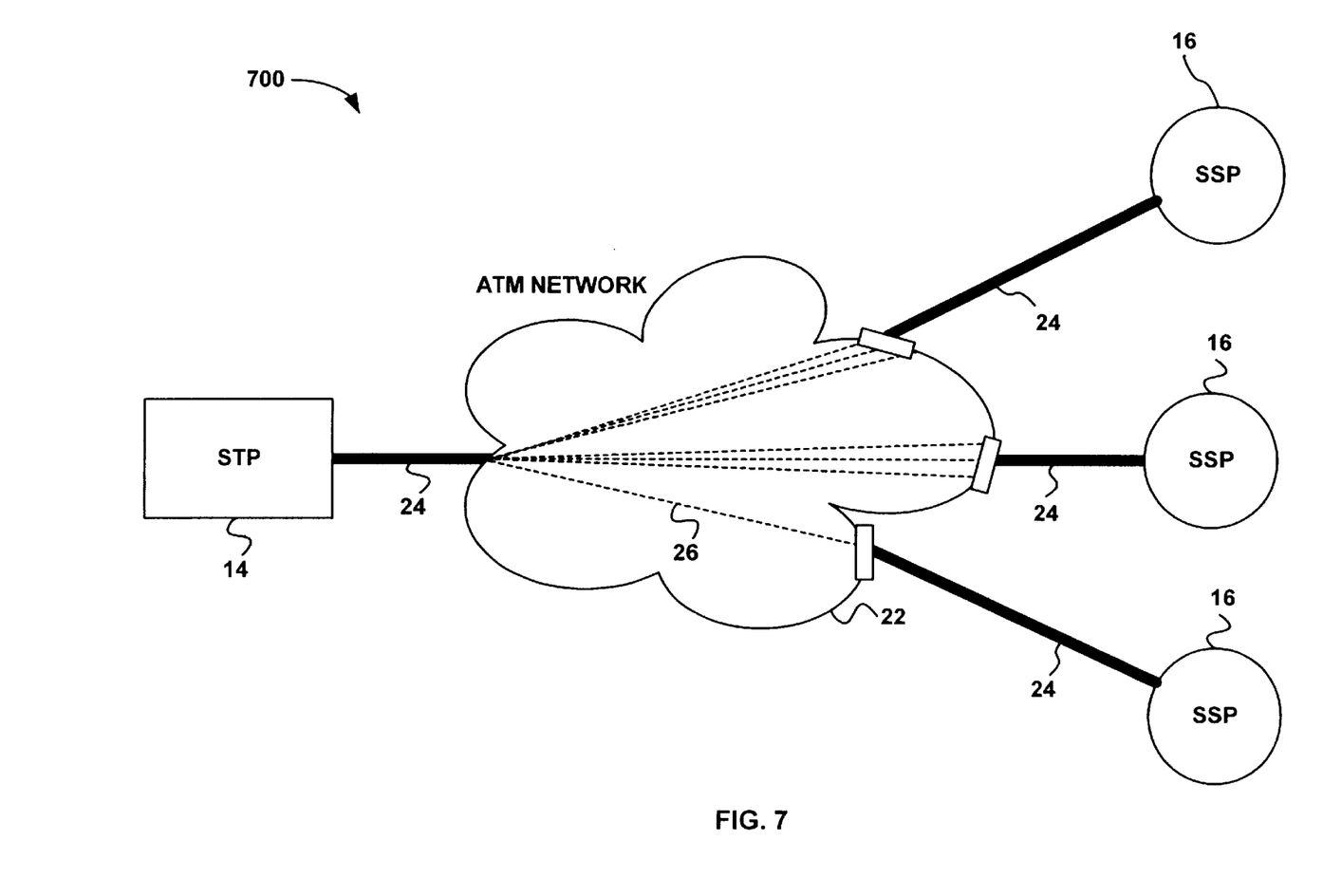
FIG. 7 is a schematic of a second embodiment of the present invention.
Figure 8:
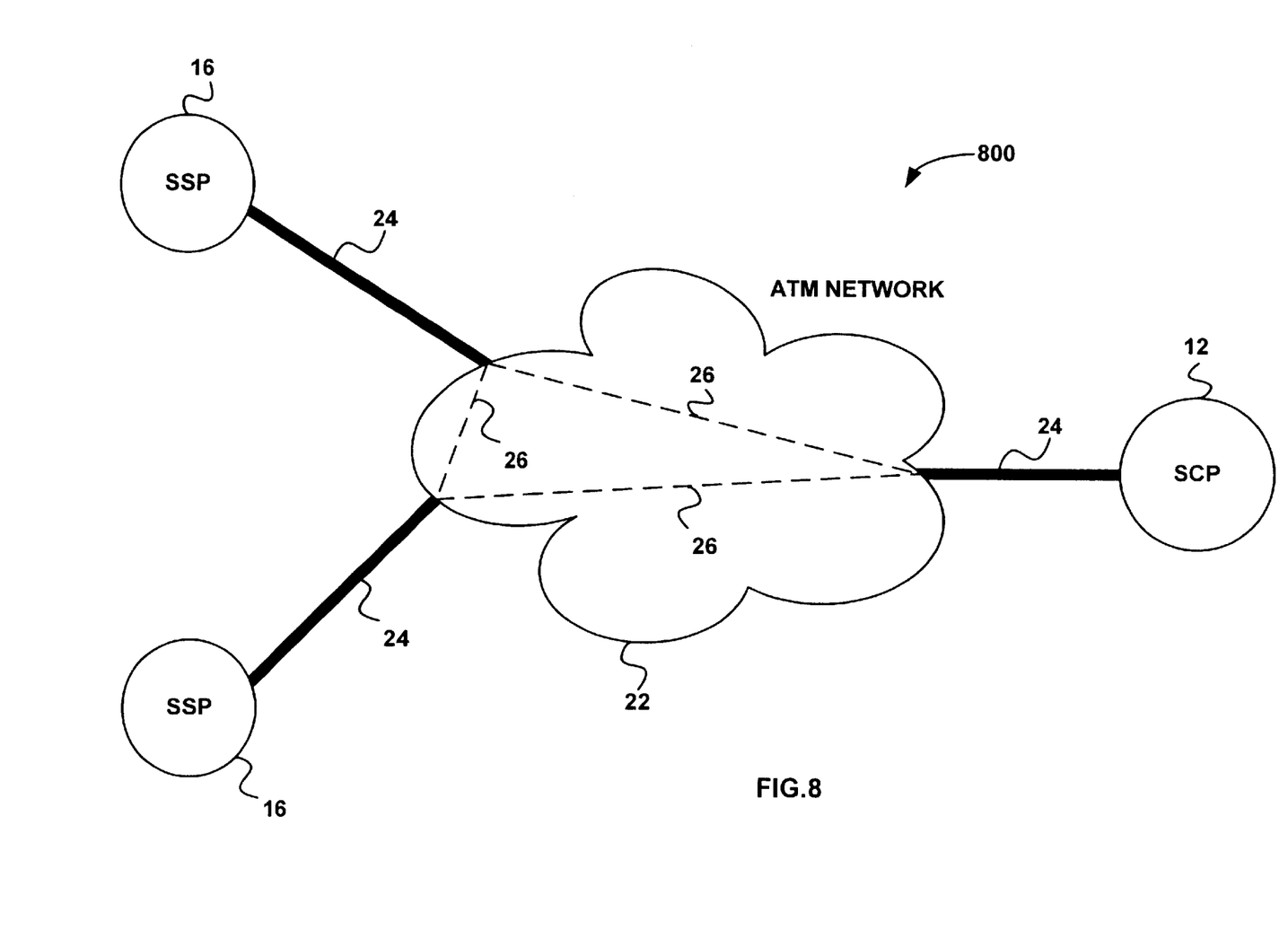
FIG. 8 is a schematic of a third embodiment of the present invention.
Figure 9:
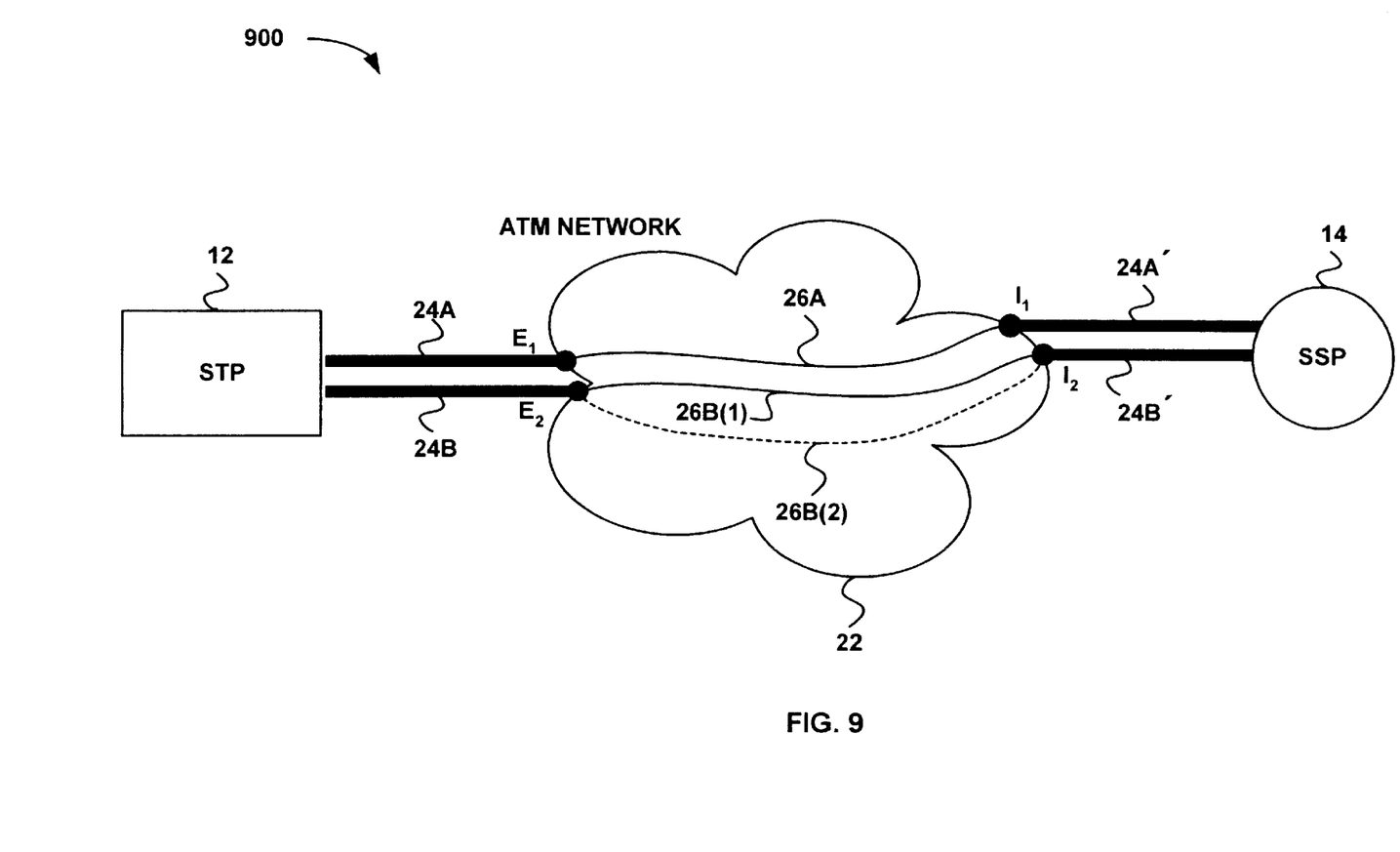
FIG. 9 is a schematic of a fourth embodiment of the present invention.

Additional benefits and advantages of the invention are illustrated in the embodiments of FIGS. 7—9.

Illustrated in FIG. 7 is further embodiment of a network incorporating the invention. Network 700 comprises STP 14 in communication with ATM network 22 over a single HSL 24. STP 14 transmits and receives data over HSL 24 via an HSL MUX (described above) and conventional data links (which are not illustrated) and may be, for example, co-located in the physical location of STP 14. Also in communication with ATM network 22, via HSLs 24, are three SSPs 16. Each HSL 24 transmits and receives data transmitted from STP 14 via logical connections 26 (shown in phantom). As described above, logical connections 26 can be configured as a PVC or a SVC. Moreover, logical connections 26 of ATM network 22 can include a combination of PVCs and SVCs depending on the requirements of the particular deployment of the invention. As illustrated in FIG. 7, network 700, if configured conventionally, would require STP 14 to have seven SS7 links to communicate with each of SSPs 16 (one for each of the logical connections illustrated). However, as illustrated, network 700 reduces the number of SS7 links at STP 14 from seven to a single HSL 24. Moreover, whereas a conventional network, such as network 10 (FIG. 1), provides point-to-point communication, network 700 can provide point-to-multipoint communication since each HSL 24 can map to multiple logical connections 26.

A further embodiment of the invention is illustrated as network 800 in FIG. 8. Network 800 comprises an SCP 12 in communication with ATM network 22 via HSL 24. Similar to STP 14 of network 700 (FIG. 7), SCP 12 includes a HSL MUX 28 (FIG. 2) which is not illustrated. Also in communication with ATM network 22, via HSLs 26, are a plurality of SSPs 16 each incorporating an HSL MUX (also not shown). As before, each HSL 24 of network 800 provides a plurality of virtual channels to the attached node. SSPs 16 communicate with SCP 12 over network 800 via a plurality of logical connections 26. Further, SSPs 16 are also in communication with each other by a logical connection 26. Accordingly, network 800 is a fully associated network. That is, each of the nodes (SSPs 16 and SCPs 12, as illustrated) is in communication with all other nodes in network 800. As result of the configuration of network 800, and unlike conventional network 10 (FIG. 1), network 800 does not require the traditional overhead of STPs (14—FIG. 1) which in conventional network 10, act as routers or multiplexors. Further, network 800, due to its fully associated nature, provides communication between all nodes with the number of links required to provide such functionality significantly reduced from that which would be required in a conventional SS7 network.

A further advantage of the invention is illustrated in the network 900 embodiment of FIG. 9. Network 900 comprises an STP 14 in communication with ATM network 22 via two separate HSLs 24A and 24B. SSP 16 is also in communication with ATM network via two separate HSLs 24A' and 24B'. Logical connection 26A spans ATM network 22 between edge points $E_1$ and $I_1$ connecting HSL 24A and 24A', thereby allowing communication between STP 14 and SSP 16. In this instance, logical connection 26A (shown in solid line) is an SVC. Logical connection 26B(1) spans ATM network 22, between edge points $E_2$ and $I_2$ connecting HSL 24B and 24B', thereby allowing further communication between STP 14 and SSP 16. Like logical connection 26A, 26B(1) (also shown in solid line) is an SVC. As in networks 700 and 800, STP 14 and SSP 16 incorporate a HSL MUX (not shown). If a fault is detected in SVC 26B(1) in ATM network 22, ATM network 22 automatically re-routes the connection between HSLs 24B, 24B' from SVC 26B(1) to SVC 26B(2) (shown in phantom). The automatic re-routing of a SVC on an ATM network, such as ATM network 22, is an inherent feature of the ATM network. Due to the failure of SVC 26B(1) and while ATM network 22 establishes SVC 26B(2), STP 14 re-routes traffic destined for SSP 16 over HSL 24A by modifying its SS7 signalling link table. Upon the establishment of SVC 26B(2), STP will re-route traffic originally destined for SVC 26B(1) to newly established SVC 26B(2) accomplished through further modification of its SS7 signalling link table (FIG. 3). Network 900 thereby incorporates two "Soft Permanent Virtual Circuits" (SPVCs) between STP 12 and SSP 14. Each SPVC compresses a PVC between a first node, for example STP 12, and the edge of ATM network 22, an SVC over ATM network 22 and a further PVC between ATM network 22 and the second node such as SSP 14.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

We claim:

1. A method for transmitting SS7 signalling data between a node and an Asynchronous Transfer Mode ("ATM") network, said SS7 signalling data destined for a plurality of physical links in communication with said ATM network, said method comprising:

for each of said plurality of physical links, establishing a virtual channel over a multiplexing physical link connecting said node and said ATM networks;

providing an identifier unique to each of said established virtual channels, said identifier comprising a Virtual Path Identifier ("VPI") and a Virtual Channel Identifier ("VCI");

encapsulating said SS7 signalling data into ATM cells incorporating said identifier corresponding to a destined one of said plurality of physical links;

transmit encapsulated data from said node to said ATM network over said multiplexing physical link on said virtual channel corresponding to said identifier in said encapsulated data;

providing a logical connection over said ATM network between each of said virtual channels on said multiplexing physical link and each of said plurality of physical links; and wherein said transmitting further comprises:

further transmitting said encapsulated data to said plurality of physical links over said logical connections.

2. The method of claim 1 wherein each of said logical connections is one of a Permanent Virtual Channel ("PVC") or a Switched Virtual Channel ("SVC").

3. A method for transmitting SS7 signalling data between a first, a second and a third node over an Asynchronous Transfer Mode ("ATM") network, said method comprising:

establishing a first physical link between said first node and ATM network;

establishing a second physical link between said second node and said ATM network;

establishing a third physical link between said third node and said ATM network;

provisioning a logical connection on said ATM network between each of said first, said second and said third physical links with said ATM network;

provisioning a first virtual channel on said first physical link for said second node;

provisioning a second virtual channel on said first physical link for said third node;

provisioning a first virtual channel on said second physical link for said first node;

provisioning a second virtual channel on said second physical link for said third node;

provisioning a first virtual channel on said third physical link for said first node;

provisioning a second vial channel on said third physical link for said second node;

transmitting SS7 signalling data from said first node to said second node over said first virtual channel of said first physical link, said logical connection interconnecting said first virtual channel on said first physical link and said first virtual channel on said second physical link over said ATM network;

transmitting SS7 signalling data from said first node to said third node over said second virtual channel of said first physical link, said logical connection interconnecting said second virtual channel on said first physical link and said first virtual channel on said third physical link over said ATM network; and transmitting SS7 signalling data from said second node to said third node over said second virtual channel of said second physical link, said logical connection interconnecting said second virtual channel on said second physical link and said second virtual channel on said third physical link over said ATM network.

4. The method of claim 3 wherein provisioning said first and second virtual channels on each of said fist, second and third physical links comprises generating and storing an identifier unique to each of said first and second virtual channels on said physical links.

5. The method of claim 4 wherein said identifier of said first and second virtual channels comprises a Virtual Path Identifier ("VPI") and a Virtual Channel Identifier ("VCI").

6. A device for transmitting and receiving data from a High Speed Link ("HSL"), said HSL connecting said device to an Asynchronous Transfer Mode ("ATM") network, said device comprising:

a first input/output ("I/O") port in communication with an SS7 first node;

a second I/O port in communication with said HSL;

a memory in communication with a processor; and said processor is adapted to:

receive SS7 signal data from said first I/O port destined for a plurality of SS7 second nodes;

generate ATM cells representative of said received SS7 signal data wherein each of said ATM cells generated includes an identifier identifying one of a plurality of channels on said HSL dedicated to transmission of ATM cells between said SS7 first node and one of said plurality of SS7 second nodes;

transmit said generated ATM cells through said second I/O pot to said HSL;

receive ATM cells from said HSL representing SS7 signal data transmitted from said plurality of SS7 second nodes;

generate SS7 signal data from said received ATM cells; and transmit said generated SS7 signal data to said SS7 first node.

7. The device of claim 6 wherein said identifier comprises a Virtual Path Identifier ("VPI") and a Virtual Channel Identifier ("VCI").

8. The device of claim 7 wherein said VPI has eight bits and said VCI has sixteen bits in length.

9. The device of claim 8 wherein said VPI and VCI are stored in a look-up table stored in said memory.

10. A method of transmitting SS7 signalling data between a first SS7 node and a plurality of other SS7 nodes, said method comprising:

on a first physical link connecting said first SS7 node to an Asynchronous Transfer Mode ("ATM") network, for each pair of SS7 nodes, said pair comprising said first SS7 node and a selected one of said plurality of other SS7 nodes:

provisioning a virtual channel on said first physical link, said channel dedicated to said SS7 sidling data transmitted between said first SS7 node and said selected one of said plurality of nodes;

provisioning a first logical connection over said ATM network between said first physical link and said selected one of said plurally of SS7 nodes;

encapsulating said SS7 signalling data into ATM cells, said ATM cells incorporating in an ATM header an identifier unique to said channel; and transmitting said encapsulated SS7 signalling data from said first SS7 node to said selected one of said plurality of other SS7 nodes over said channel dedicated to communication between said first SS7 node and said selected one of said plurality of other SS7 nodes and over said logical connection between said first physical link and said selected one of said plurality of other SS7 nodes.

11. The method of claim 10 wherein said first logical connection is one of a Permanent Virtual Channel ("PVC") or a Switched Virtual Channel ("SVC").

12. The method of claim 11 wherein said provisioning of said channel on said physical link comprises generating and storing said identifier unique to said channel.

13. The method of claim 12 wherein said identifier comprises a Virtual Path Identifier ("VPI") eight bits in lend and a Virtual Channel Identifier ("VCI") sixteen bits in length.

14. A method of transmitting SS7 data between a plurality of nodes, each of said plurality of nodes in communication with an Asynchronous Transfer Mode ("ATM") network, said method comprising:

for at least one node of said plurality of nodes, providing for each other node a virtual channel on a High Speed Link ("HSL"), said HSL connecting said at leas one node to said ATM network, each of said virtual channels dedicated to the transmission of data between said at least one node and one of said other nodes;

providing a logical connection over said ATM network between each of said virtual channels and each of said other nodes;

transmitting data between said at least one node and one of said other nodes over said logical connection on said ATM network and said virtual channel on said HSL, said data comprising ATM cells; and for each of said other nodes providing a virtual channel on an HSL link connecting said other node to said ATM network.

15. A method of transmitting SS7 data between a plurality of nodes, each of said plurality of nodes in communication with an Asynchronous Transfer Mode ("ATM") network, said method comprising:

for at least one node of said plurality of nodes, providing for each other node a virtual channel on a High Speed Link ("HSL"), said HSL connecting said at least one node to said ATM networks, each of said virtual channels dedicated to the transmission of data between said at least one node and one of said other nodes;

providing a logical connection over said ATM network between each of said virtual channels and each of said other nodes; and transmitting data between said at least one node and one of said other nodes over said logical connection on said ATM network and said virtual channel on said HSL, said data comprising ATM cells, wherein said providing of said virtual channels comprises generating an identifier identifying said virtual channel on said HSL and inserting said identifier in said ATM cells transmitted on said HSL.

16. The method of claim 15, wherein said identifier comprises a Virtual Path Identifier ("VPI") and a Virtual Channel Identifier ("VCI").

17. The method of claim 16, wherein said VCI and VPI pair form an identifier that is unique for said HSL.

18. A method of transmitting SS7 data between a first and a second SS7 node, said second node in communication with an Asynchronous Transfer (ATM) network by a first and second physical link, said first node in communication with said ATM network by a first and a second High Speed Link (HSL), said method comprising:

provisioning a first virtual channel on said firs HSL and said first physical link, said channel dedicated to said SS7 signalling data transmitted between said first SS7 node and said second SS7 node;

provisioning a first logical connection over said ATM network between first HSL and said first physical link;

provisioning a second virtual channel on said second HSL and said second physical link, said channel dedicated to said SS7 signalling data transmitted between said first SS7 node and said second SS7 node;

provisioning a second logical connection over said ATM network between second HSL and said second physical link;

encapsulating said SS7 signalling data into ATM cells, said ATM cells incorporating in an ATM header an identifier unique to said channel; and transmitting said encapsulated SS7 signalling data from said first SS7 node to said second SS7 node over at lent one of said virtual channels dedicated to communication between said first SS7 node and said second SS7 node and over at least one of said logical connections and over at least one of said first and second physical links.

19. The method of claim 18, wherein said first and second logical connections are at least one of Permanent Virtual Channel ("PVC") or a Switched Virtual Channel ("SVC").

20. The method of claim 19, further comprising:

upon the failure of first logical connections, provisioning a replacement virtual chancel on said second HSL and transmitting said encapsulated data on said replacement virtual channel on said second HSL and id second logical connection.

21. The method of claim 20 further comprising:

establishing a replacement logical connection between said first physical link and said first HSL previously in communication by said failed first logical connection;

transmitting encapsulated data between said first SS7 node and said second node over said first virtual channel on said first HSL in communication with said replacement logical connection and over said replacement logical connection and over said first physical link in communication with said replacement logical connection.

* * * * *

UNITED STATES PATENT AND TRADEMARK OFFICE
CERTIFICATE OF CORRECTION

PATENT NO. : 6,714,560 B1
DATED : March 30, 2004
INVENTOR(S) : Drover et al.

It is certified that error appears in the above-identified patent and that said Letters Patent is hereby corrected as shown below:

Column 13,
Line 14, "ATM networks" should be changed to -- ATM network --
Line 22, "transmit encapsulated" should be changed to -- transmitting encapsulated --

Column 14,
Line 63, "SS7 sidling" should be changed to -- SS7 signalling --
Line 68, "plurally of SS7" should be changed to -- plurality of SS7 --

Column 15,
Line 19, "eight bits in lent" should be changed to -- 8 bits in length --

Column 16,
Line 31, "node over at lent" should be changed to -- node over at least --
Line 41, "logical connections," should be changed to -- logical connection --
Line 42, "virtual chancel" should be changed to -- virtual channel --
Line 44, "and id second logical connection" should be changed to
-- and said second logical connection --

Signed and Sealed this

Twentieth Day of July, 2004

JON W. DUDAS
*Acting Director of the United States Patent and Trademark Office*